(12) United States Patent
Thomas et al.

(10) Patent No.: US 11,214,214 B2
(45) Date of Patent: Jan. 4, 2022

(54) VEHICLE SEAT INCORPORATING A SEAT BOTTOM FRONT EDGE AIRBAG

(71) Applicant: GM GLOBAL TECHNOLOGY OPERATIONS LLC, Detroit, MI (US)

(72) Inventors: Scott D. Thomas, Novi, MI (US); Kunling Shen, Farmington Hills, MI (US); Jay S. Song, Ann Arbor, MI (US); James M. House, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 16/826,517

(22) Filed: Mar. 23, 2020

(65) Prior Publication Data
US 2021/0291773 A1    Sep. 23, 2021

(51) Int. Cl.
*B60R 21/207*    (2006.01)
*B60R 21/239*    (2006.01)
*B60R 21/2338*    (2011.01)
*B60R 21/00*    (2006.01)

(52) U.S. Cl.
CPC .......... *B60R 21/207* (2013.01); *B60R 21/239* (2013.01); *B60R 21/2338* (2013.01); *B60R 2021/0053* (2013.01); *B60R 2021/23382* (2013.01)

(58) Field of Classification Search
CPC . B60R 21/207; B60R 21/239; B60R 21/2338; B60R 2021/0053; B60R 2021/23382
See application file for complete search history.

(56) References Cited

U.S. PATENT DOCUMENTS

| | | | |
|---|---|---|---|
| 5,791,597 A * | 8/1998 | Knoll | B60N 2/4242 244/121 |
| 6,217,059 B1 * | 4/2001 | Brown | B60R 21/16 280/730.1 |
| 7,669,897 B2 * | 3/2010 | Sano | B60R 21/045 280/752 |
| 9,283,916 B2 * | 3/2016 | Nagasawa | B60R 21/231 |
| 10,569,890 B2 * | 2/2020 | Moeller | B60R 21/207 |
| 2019/0337427 A1 * | 11/2019 | Thomas | B60N 2/427 |
| 2019/0389414 A1 * | 12/2019 | Masuda | B60N 2/4279 |

* cited by examiner

*Primary Examiner* — Drew J Brown
(74) *Attorney, Agent, or Firm* — Vivacqua Crane PLLC

(57) ABSTRACT

A vehicle seat includes a seat bottom having a forward-facing surface relative to the vehicle seat and an airbag mounted to the seat bottom. The airbag includes an inflator mounted to the seat bottom and an airbag cushion including a portion positioned adjacent the forward-facing surface of the seat bottom.

18 Claims, 6 Drawing Sheets

VEHICLE SEAT INCORPORATING A SEAT BOTTOM FRONT EDGE AIRBAG

FIELD

The present disclosure relates to a vehicle seat incorporating a seat bottom edge airbag.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Impact forces experienced in a vehicle typically differ significantly depending upon the direction of the impact. For example, the impact forces experienced in an impact to the front of the vehicle are typically significantly higher than those experienced in an impact to the rear of the vehicle. Conventional vehicles have primarily only included vehicle seats which are forward-facing, therefore, vehicle designers have primarily focused upon occupant safety systems which are designed to restrain forward facing passengers from an impact to the front of the vehicle. While these same vehicle designers have also designed occupant restraint systems to protect forward facing occupants from impacts from a direction other than to the front of the vehicle, these impact forces are much more likely to be of significantly reduced severity than those forces experienced in a front impact.

SUMMARY

In an exemplary aspect, a vehicle seat includes a seat bottom having a forward-facing surface relative to the vehicle seat and an airbag mounted to the seat bottom. The airbag includes an inflator mounted to the seat bottom and an airbag cushion including a portion positioned adjacent to the forward-facing surface of the seat bottom.

In another exemplary aspect, the seat bottom partially encompasses the inflator and the seat bottom is configured to allow the airbag cushion to deploy directly downward from the inflator.

In another exemplary aspect, the seat further includes a fastener connecting the airbag cushion to the forward-facing surface.

In another exemplary aspect, the airbag cushion is configured to react against a portion of the seat bottom away from the inflator and the seat bottom and airbag cushion pressure creates a reaction surface for the airbag cushion that prevents the airbag cushion from rotating rearwardly relative to the vehicle seat.

In another exemplary aspect, the seat bottom includes a seat frame with a forward-facing channel and wherein the inflator is positioned in the forward-facing channel.

In another exemplary aspect, the airbag cushion is configured to inflate at least partially into a volume in front of the seat bottom in response to activation of the inflator.

In another exemplary aspect, the airbag cushion includes a tether attaching a first portion of an inner surface of the airbag cushion to a second portion of the inner surface of the airbag cushion.

In another exemplary aspect, the airbag cushion includes a first vent to outside atmosphere.

In another exemplary aspect, the airbag cushion further includes a second vent that is aligned to allow gas to pass through the first vent during a first stage of airbag deployment and is configured to misalign to prevent gas from passing through the first vent during a second stage of airbag deployment when the tether has been pulled taught to cause the misalignment of the first vent and the second vent.

In another exemplary aspect, the airbag further includes a reaction surface that moves via forces communicated to it by the cushion during deployment and achieves a resting position where it can support the cushion once the cushion is filled with gas and transmit cushion forces to the seat bottom.

In another exemplary aspect, the reaction surface comprises at least two pieces.

In another exemplary aspect, the reaction surface is pivotally connected to the seat bottom frame at a pivot that is responsive to an inflation of the airbag cushion to pivot downwardly and rearwardly about the pivot, and the reaction surface includes a pivot limiting surface which limits the rotation of the pivoting reaction surface about the pivot.

In another exemplary aspect, the inflator is mounted behind a forward portion of a seat bottom frame.

In another exemplary aspect, the airbag cushion is distributed around a lower portion and a side portion of the seat bottom frame.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
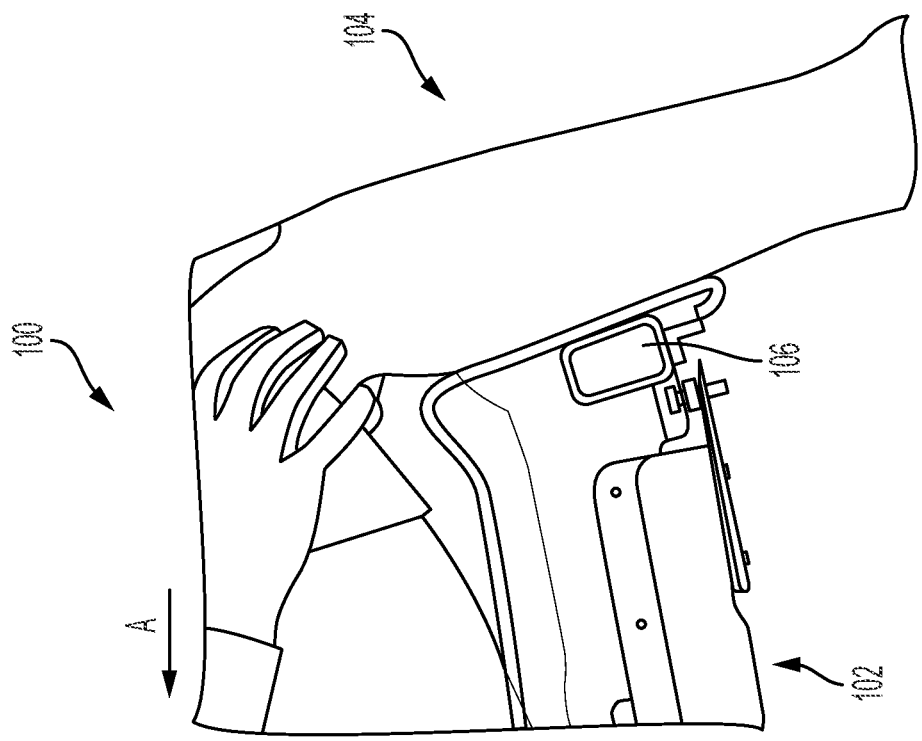
FIG. 1 is a side elevation view of a vehicle occupant positioned in a rearwardly-facing vehicle seat.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Autonomous vehicles and some conventional vehicles, such as some 3 row of seating vehicles can have seating positions that do not face forward. Therefore, these vehicles will have seating positions that orient occupants in other than forward-facing directions. The inventors of the present disclosure have discovered potential issues relating to mitigation of and/or elimination of potential for injury of vehicle occupants in a vehicle impact. Conventional vehicle seat designs and occupant protection systems are adapted primarily for forward facing seats and are adapted to address the higher impact forces experienced in a vehicle frontal impact. By contrast, the inventors of the present disclosure have discovered and addressed issues applicable to the higher impact forces experienced in a vehicle frontal impact and the mitigation of and/or elimination of potential injury to occupants in rearward-facing seats in those vehicles during a frontal impact. In a vehicle impact from a rear direction (from the perspective of an occupant's vehicle seat) the occupant's lower legs may swing and/or move rearwardly and result in an undesired contact with the front edge of the seat bottom. In addition, occupants in rear impacts and possibly side impacts where the seat is oriented so that the impact comes from behind the occupant can also experience similar lower leg to seat bottom contact, including in conventional forward facing seats with respect to the front of the vehicle.

Co-pending and co-assigned U.S. patent application Ser. No. 15/968,142, the disclosure of which is hereby incorporated in its entirety, discloses an airbag assembly including an airbag cushion, cushion mount that is configured to mount an airbag cushion under a seat of a vehicle, and an inflator configured to inflate the airbag cushion. The airbag cushion is configured to project toward the legs of the occupant and toward the floor of the vehicle and at least partially fill a space between a bottom surface of the seat and the floor of the vehicle when the airbag cushion is inflated to provide a reaction surface for a back surface of a leg of a passenger in the seat. In this manner, the airbag cushion may absorb energy resulting from the rearward swing of the occupant's legs.

Figure 2:
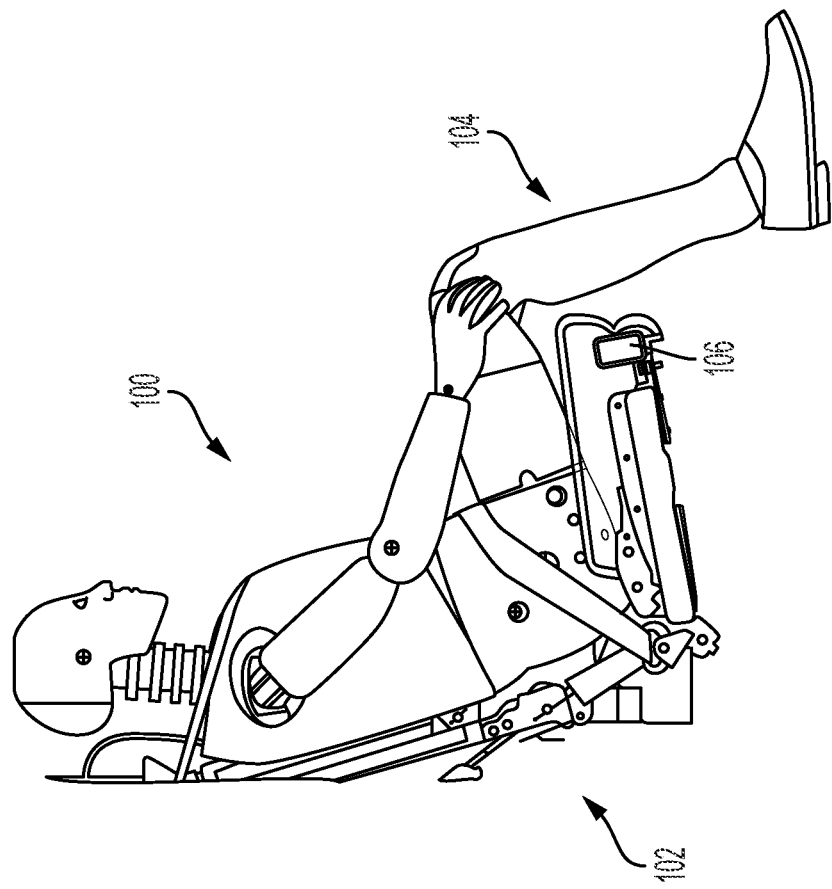
FIG. 2 is a close-up detail view of the vehicle occupant of FIG. 1.

Referring now to the drawings, wherein like reference numbers correspond to like or similar components throughout the several figures, FIG. 1 illustrates an occupant 100 positioned in a rearwardly-facing vehicle seat 102 under normal vehicle operating conditions. FIG. 2 is an expanded detail illustration of a condition in a vehicle front impact for the occupant 100 in the rearwardly-facing vehicle seat 102.

As a result of the frontal impact, the occupant 100 moves forward relative to the vehicle as indicated by the direction arrow A. This movement in the forward direction A means the occupant 100 moves forward in the vehicle relative to the seat 102. As a result, the lower legs 104 of the occupant 100 may come into contact with the seat structure 106, as illustrated in FIG. 2. The airbag cushion disclosed in co-assigned, co-pending U.S. patent application Ser. No. 15/968,142 improves this situation by providing an airbag which inflates downward from the bottom of the seat and projects forward to absorb at least a portion of the energy from the rearward swing of the occupant's legs.

The inventors of the present disclosure invented an airbag which mitigates and/or prevents leg injuries resulting from contact between the occupant's legs and the forward face of the seat bottom. In contrast to an airbag which deploys from a bottom of the seat, there is a substantially reduced packaging volume which is available for a seat bottom forward face deploying airbag. The present invention is capable of providing enhanced occupant restraint in this reduced packaging space.

In addition, an airbag which deploys downward from a bottom of a seat necessarily extends into a volume under the seat which may be occupied by items positioned under the seat. It is common for vehicle occupants to store items under the vehicle seats and any item positioned in this area may undesirably interfere with an airbag that is designed to deploy from a bottom of a vehicle seat into the volume that is already occupied by items. Further, some vehicle designs may significantly reduce and/or entirely eliminate any volume available under a seat bottom into which a seat bottom downwardly deploying airbag would otherwise deploy, thereby limiting vehicle configurations which may have otherwise benefited from such an airbag. In contrast, the airbag of the present disclosure does not require unoccupied volume below a vehicle seat bottom in order to operate and provide restraint to an occupant. The present invention has the additional benefit of being able to be used in cooperation with other airbag cushions, including a downward deploying vehicle seat bottom airbag.

Figure 3:
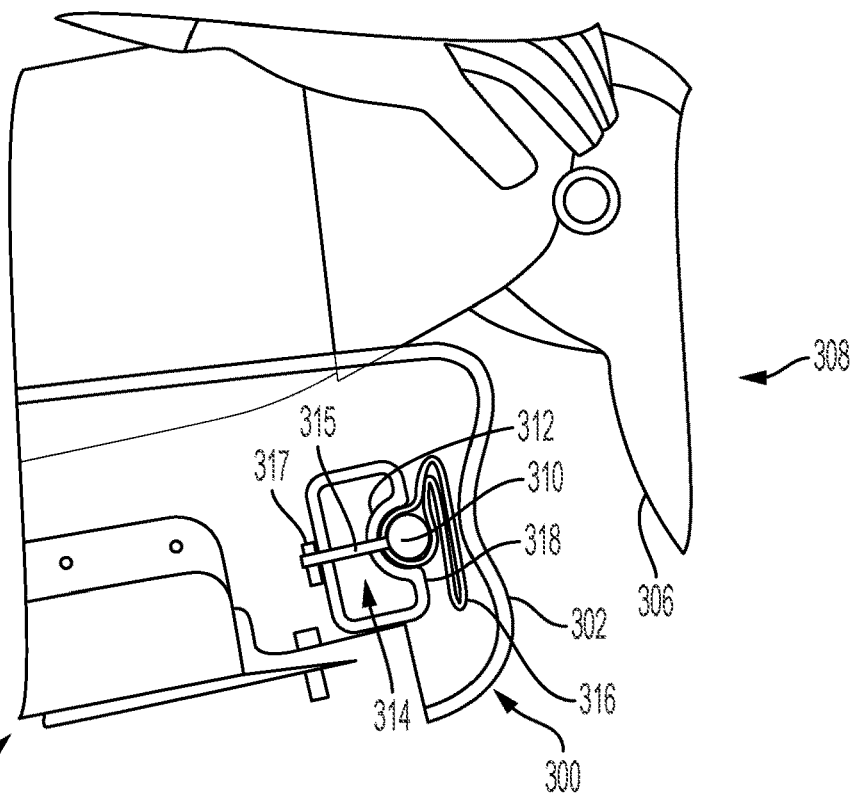
FIG. 3 is a side elevation view of a seat bottom front edge airbag in a stored configuration in accordance with an exemplary embodiment of the present invention.
Figure 4:
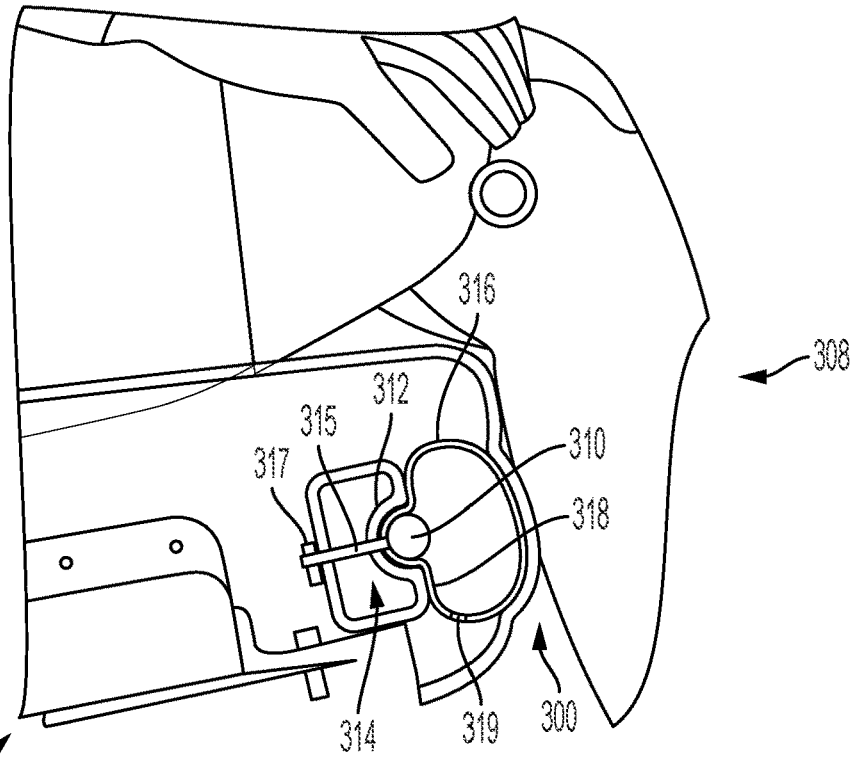
FIG. 4 is a side elevation view of the seat bottom front edge airbag FIG. 3 in a deployed configuration.

FIG. 3 is a side-elevation view of a seat bottom front edge airbag 300 in a stored configuration in accordance with an exemplary embodiment of the present invention and FIG. 4 is a side-elevation view of the seat bottom front edge airbag 300 in a deployed configuration. FIG. 3 illustrates the situation in a pre-vehicle impact configuration where a gap exists between the front surface 302 of the seat bottom 304 and the rear surface 306 of an occupant's leg 308. The seat bottom front edge airbag 300 includes an inflator 310 that positioned in a channel 312 in a seat bottom frame portion 314 and an airbag cushion 316 which is folded flat and positioned on the front face 318 of the seat bottom frame portion 314. Inflator 310 has a mechanical fastener consisting of a stud 315 and a nut 317 that ensures that the inflator and a portion of the cushion 316 remain in front of the seat bottom frame portion 314 when the cushion 316 is in a deployed state.

In a vehicle impact coming from the rear direction relative to the vehicle seat, the occupant of the seat moves rearwardly into the vehicle seat. Thus, a comparison between the relative position of the occupant in FIGS. 3 and 4 clearly illustrates that the occupant has moved in a rearward direction A. This rearward motion may result in a rear surface 306 of the occupant's leg 308 moving toward the front surface 302 of the seat bottom 304. During such a vehicle impact, an airbag module (not shown) may receive signals from sensors (not shown) that indicate a rear impact relative to the seat.

In response, the airbag module may issue a signal to the seat bottom front edge airbag 300 which causes the airbag inflator 310 to inflate the airbag cushion 314. The airbag cushion 314 then inflates into the gap between the front surface 302 of the seat bottom 304 and the rear surface 306 of the occupant's leg 308 as illustrated in FIG. 4. In this manner, the airbag cushion 314 of the seat bottom front edge airbag 300 is able to absorb the energy of the occupant's leg 308 moving toward the seat bottom 304 and minimize and/or prevent injury to the occupant's leg 308. Cushion 314 may also have one or more vents 319 to outside atmosphere, as shown in FIG. 4 to help control energy absorption.

Figure 5:
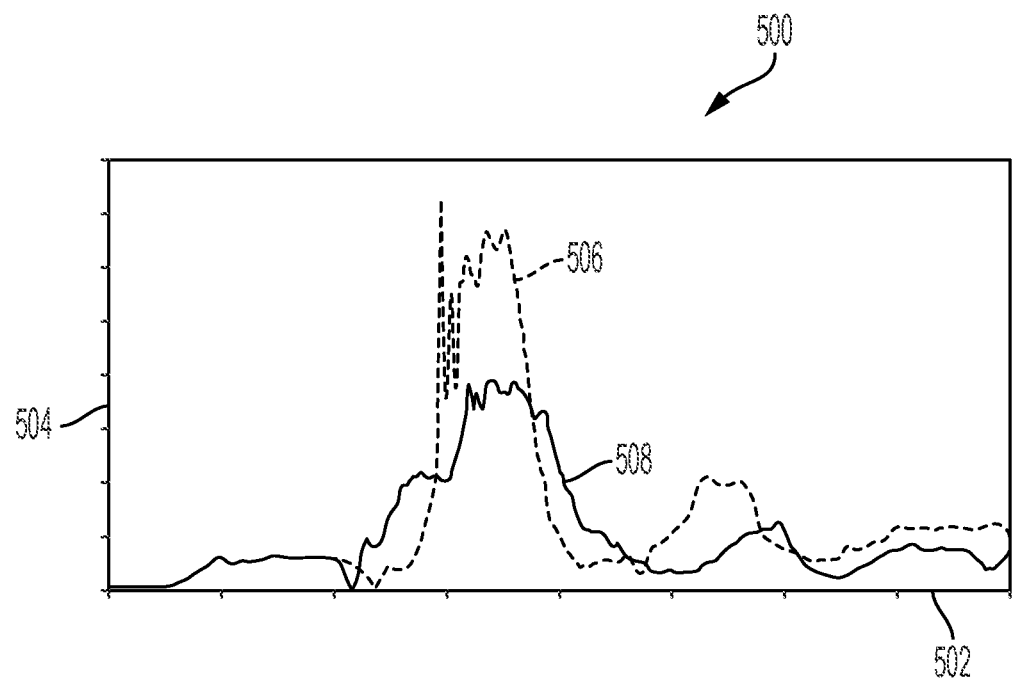
FIG. 5 is a graph illustrating an improvement in an upper tibia index for a seat bottom front edge airbag in accordance with an exemplary embodiment of the present disclosure.
Figure 6:
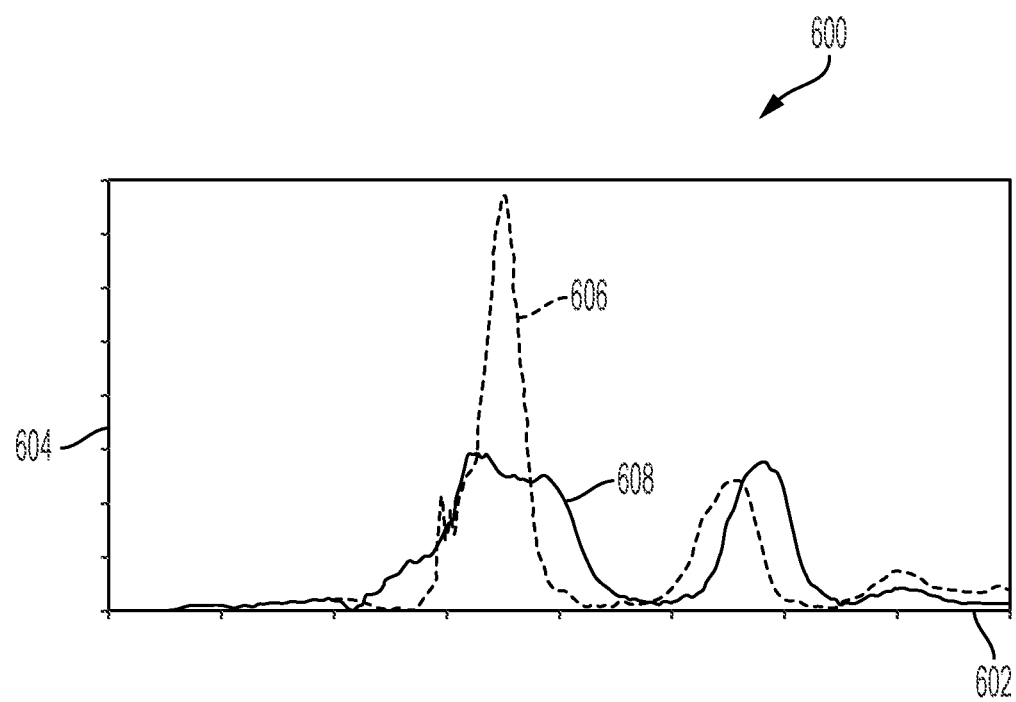
FIG. 6 is a graph illustrating an improvement in a lower tibia index for a seat bottom front edge airbag in accordance with an exemplary embodiment of the present disclosure.

FIG. 5 is a graph 500 illustrating an improvement in an upper tibia index for a seat bottom front edge airbag in accordance with an exemplary embodiment of the present disclosure and FIG. 6 is a graph 600 illustrating an improvement in a lower tibia index for a seat bottom front edge airbag in accordance with an exemplary embodiment of the present disclosure. The horizontal axes, 502 and 602, of each of these graphs 500 and 600, respectively, illustrate the passage of time. The vertical axes, 504 and 604, of each of these graphs 500 and 600, respectively illustrate the magnitude of an existing injury criteria for lower leg fractures known as a Tibia Index. The Tibia Index is a well-known injury tolerance criterion for combined bending and axial compressive loads on the tibia that is determined through calculation and based upon measured compressive axial force and the measured bending moment in the leg and known critical values for bending moment and compressive forces. The graph 500 of FIG. 5 illustrates the magnitude of the upper tibia index 506 for a vehicle which does not include an exemplary embodiment of the seat bottom front edge airbag in accordance with the present disclosure and also illustrates the magnitude of the upper tibia index 508 for a vehicle which includes an exemplary embodiment of the seat bottom front edge airbag in accordance with the present disclosure. The upper tibia index 506 is substantially higher than the upper tibia index 508, thereby illustrating a significant improvement when using the seat bottom front edge airbag in accordance with the present disclosure. Similarly, the graph 600 of FIG. 6 illustrates the magnitude of the lower tibia index 606 for a vehicle which does not include an exemplary embodiment of the seat bottom front edge airbag in accordance with the present disclosure and also illustrates the magnitude of the lower tibia index 608 for a vehicle which includes an exemplary embodiment of the seat bottom front edge airbag in accordance with the present disclosure. The lower tibia index 606 is substantially higher than the lower tibia index 608, thereby illustrating a significant improvement when using the seat bottom front edge airbag in accordance with the present disclosure.

Figure 7:
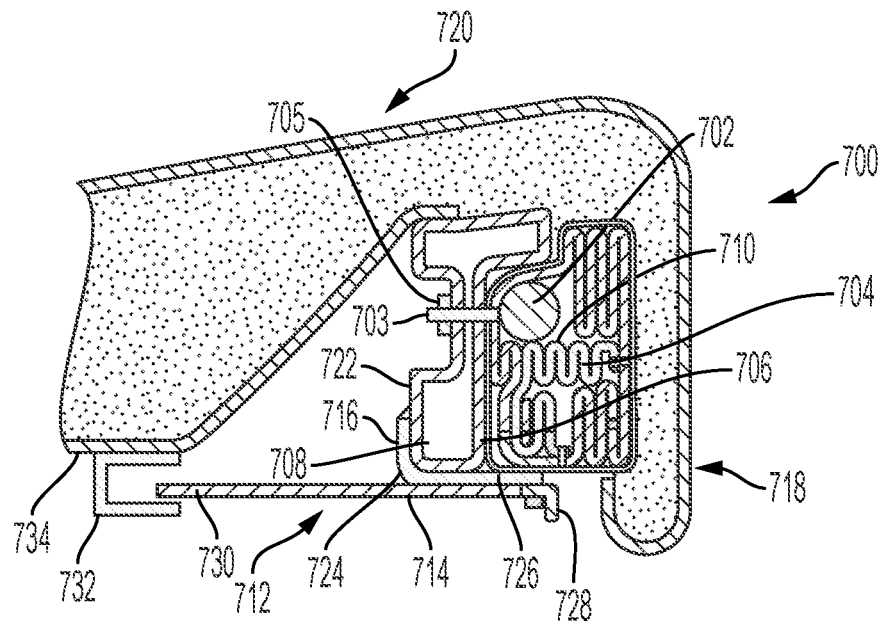
FIG. 7 is a side elevation view of another seat bottom front edge airbag in accordance with an exemplary embodiment of the present disclosure in a stored configuration.
Figure 8:
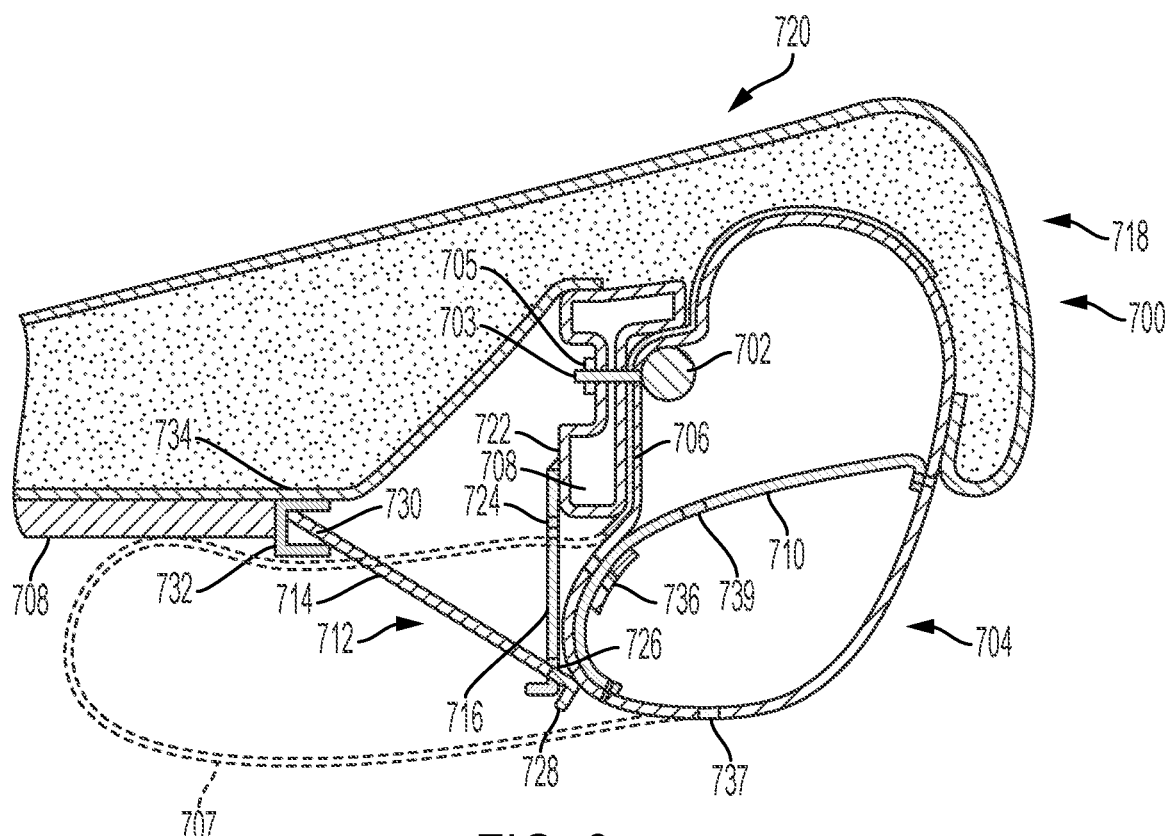
FIG. 8 is a side elevation view of the seat bottom front edge airbag of FIG. 7 in a deployed configuration.

FIG. 7 is a side elevation view of another seat bottom front edge airbag 700 in accordance with an exemplary embodiment of the present disclosure in a stored configuration and FIG. 8 is a side elevation view of the seat bottom front edge airbag 700 in a deployed configuration. The airbag 700 includes an inflator 702 and an airbag cushion 704 that is mounted on the front surface 706 of a seat bottom frame 708. Inflator 702 has a mechanical fastener consisting of a stud 703 and a nut 705 that ensures that the inflator and a portion of the cushion 704 remain in front of the seat bottom frame 708 when the cushion 704 is in a deployed state. The airbag cushion 704 includes a tether 710 which may, at least partially, control the inflation of the airbag cushion 704. The airbag 700 further includes a deployable reaction surface 712 which includes a downwardly pivoting reaction surface 714 and a downwardly extending reaction surface 716. Each of the downwardly pivoting reaction surface 714 and the downwardly extending reaction surface 716 provide reaction surfaces against which the airbag cushion 704 may react during inflation. The reaction surfaces provide support which may control the inflation of the airbag and the shape of the airbag cushion which may better enable the airbag cushion 704 to absorb energy from the movement of an occupant's leg (not shown) toward the front edge 718 of the seat bottom 720.

In the exemplary embodiment illustrated in FIGS. 7 and 8, the downwardly extending reaction surface 716 is attached to a rear surface 722 of the seat bottom frame 708. The downwardly extending reaction surface 716 includes a hinge 724 which enables a distal extent 726 of the downwardly extending reaction surface 716 to be stowed against the seat bottom frame 708 prior to deployment (FIG. 7) and to hinge downwardly in the deployed configuration (FIG. 8). The distal extent 726 of the downwardly extending reaction surface 716 may also be connected to a corresponding distal extent 728 of the downwardly pivoting reaction surface 714. A proximal extent 730 of the downwardly pivoting reaction surface 714 is captured within a pivot channel 732 that is mounted on another portion 734 of the seat bottom frame 708. During an inflation event, the inflating airbag cushion 704 may push against the distal extent 728 of the downwardly pivoting reaction surface 714, the distal extent 726 of the downwardly extending reaction surface 716 or both which causes both the downwardly pivoting reaction surface 714 to pivot downwardly from the pivot channel 732 and the downwardly extending reaction surface 716 to move downward since the distal extent 726 of the downwardly extending reaction surface 716 and the distal extent 728 of the downward pivoting reaction surface 714 are interconnected. As this occurs, the distal extent 726 hinges downwardly from the hinge 724.

If the deployable reaction surface 712 is not present, the cushion 704 may extend under the seat as shown with dashed lines 707 in FIG. 8 and use seat structure 708 as a reaction surface in a manner similar to that disclosed in co-pending and co-assigned U.S. patent application Ser. No. 15/968,142. In this manner, the cushion 704, which is attached to the seat frame at the inflator 702 location can react against the underside of seat bottom frame 709 where the dashed portion of the cushion 707 is shown. The cushion pressure and this cushion shape will prevent the cushion 704 from rotating away from the occupant's legs when the occupant's legs load the cushion 704.

The exemplary embodiment illustrated in FIGS. 7 and 8 may have the additional advantage of having an escape path for inflation energy which improves the control over the amount of inflation energy which may be directed to an occupant's legs. The airbag 700 includes an airbag cushion 704 that may controllably inflate into the volume below the seat bottom 720 since there is no seat frame below the folded cushion 704. As the cushion 704 deploys, the gas from the inflator 702 can push the cushion downward as the gas expands and fills the cushion. In this manner, the inflation energy which is directed toward an occupant's legs may be better controlled. Another feature which improves the ability to controllably direct inflation energy during inflation of the airbag cushion 704 are first vent 736 and second vent 737. The first vent 736 is positioned in the tether 710 and the second vent 737 is positioned on the underside of the cushion 704. The first and second vents 736 and 737 may be optimized to control the flow of inflation gases either entirely out of the airbag cushion 704 or between chambers (not shown) within the airbag cushion 704. In this manner, the exemplary airbag 700 further improves the ability to reliably control the distribution of energy during an inflation event.

Figure 9:
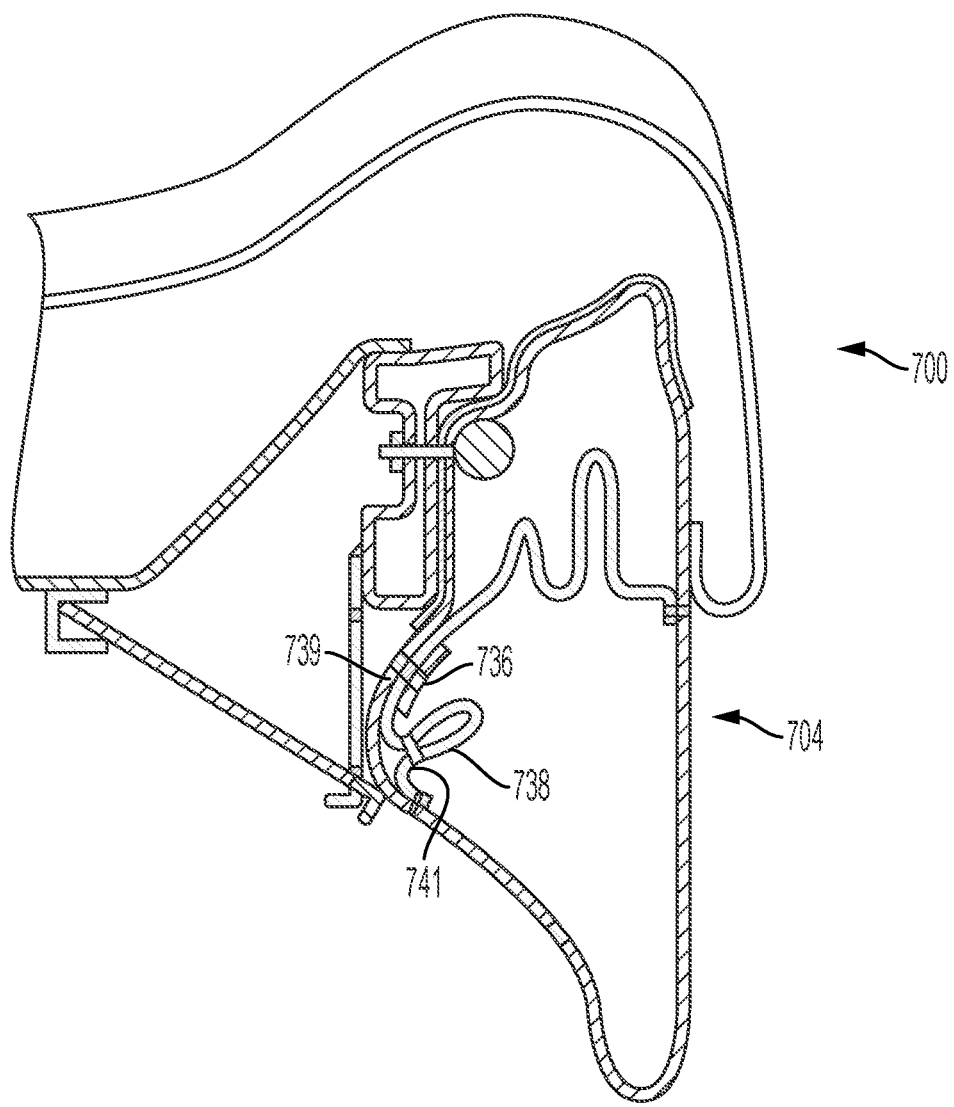
FIG. 9 illustrates another exemplary feature of the airbag of FIG. 7 during an intermediate configuration between the fully stored configuration of FIG. 7 and the fully deployed configuration of FIG. 8.

FIG. 9 illustrates another exemplary feature of the airbag 700 during an intermediate configuration between the fully stored configuration of FIG. 7 and the fully deployed configuration of FIG. 8. The airbag 700 includes a folded portion 738 of the airbag cushion 704 that is positioned adjacent to the first vent 736 and which, thereby, aligns a third vent 739 in the tether 710 with the first vent 736 to enable the flow of inflation gases through the vent 736 during an initial stage of inflation. Once the airbag cushion 704 reaches a predetermined intermediate deployment configuration, the pressure of inflation gases will cause the folded portion 738 to release and to unfold such that the third vent 739 in the tether 710 is no longer positioned in front of the first vent 736. In this manner, the folded portion 738 and third vent 739 may further improve the ability to controllably deploy the inflation of the airbag cushion to improve the ability to control the distribution of energy during an inflation event. Specifically, these vent features enable gas to escape through first vent 736 when the airbag cushion's deployment is partially blocked. This reduces the forces on the blocking object. Within the airbag industry, there are other mechanizations to control venting with a tether. Any of these mechanizations can be substituted for this specific embodiment. In addition, these mechanizations have some way to initially hold the vent hole mechanism in an open state. This can be accomplished via a tear stitch 741 that initially holds the folded portion 738 in the folded state. The tear stitch 741 can also be located near the first vent 736 and be attached to the cushion 704 and the tether 710. Tear tabs (not shown) can also be used where the parent material of either the tether 710 or cushion 704 tears to enable tether 710 movement. As the cushion 704 deploys and is unobstructed, the tether 710 is pulled. Once the tether 710 becomes taught, the tear stitch 741 will tear enabling the tether 710 to pull the third vent 739 out of alignment with the first vent 736. Otherwise, when the deployment has not progressed very far or it is obstructed by an object, the third vent 739 and the first vent 736 remain aligned and allow gas to pass through. More than one third vent 739 and one first vent 736 can be present. A plurality of third vents 739 and first vents 736 can be used.

Figure 10:
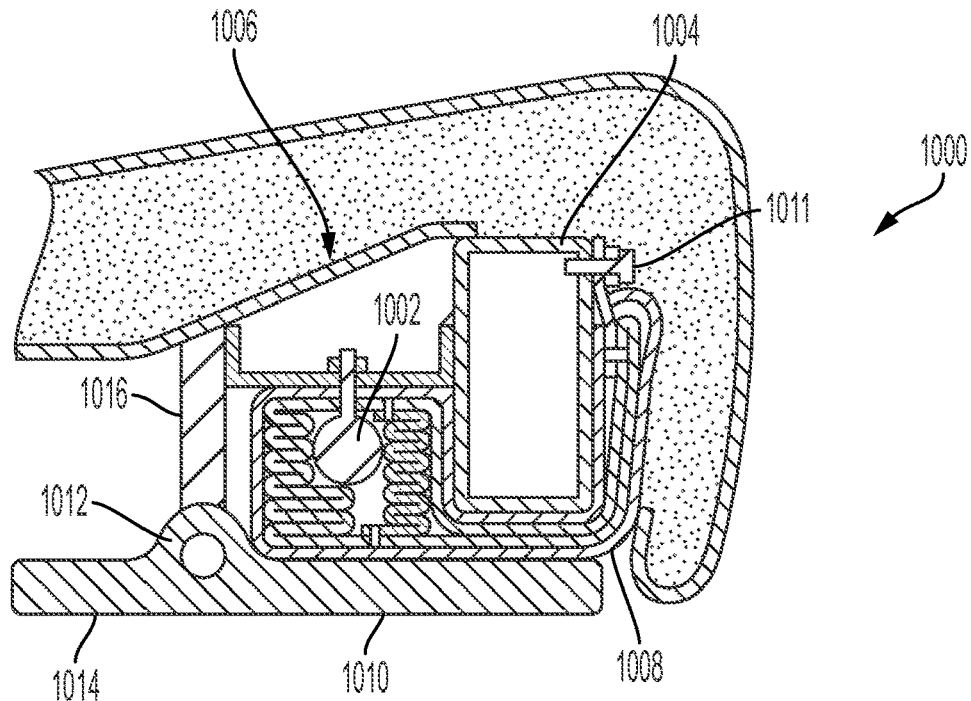
FIG. 10 provides a side elevation views of yet another exemplary embodiment of a seat bottom front edge airbag in accordance with the present disclosure in a stored configuration.
Figure 11:
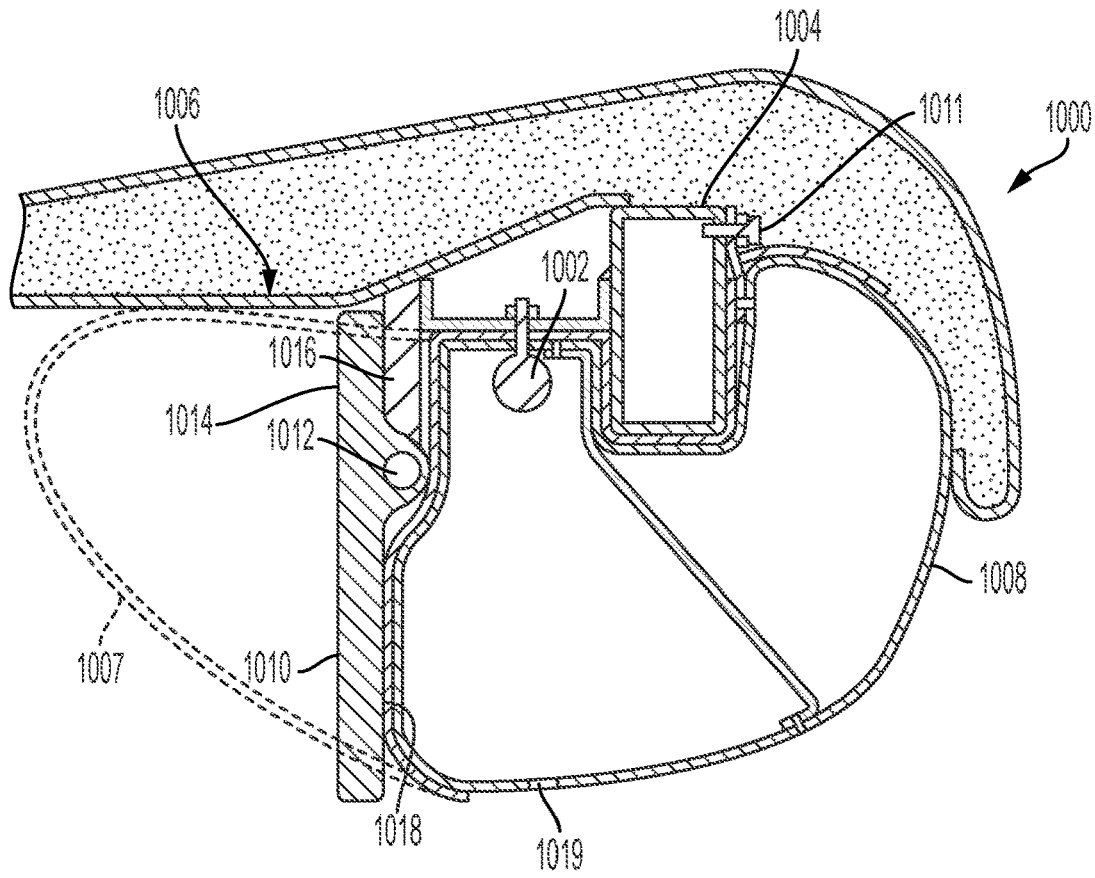
FIG. 11 provides a side elevation views of the seat bottom front edge airbag of FIG. 10 in a deployed configuration.

FIGS. 10 and 11 provide side elevation views of yet another exemplary embodiment of a seat bottom front edge airbag 1000 in accordance with the present disclosure in a stored configuration (FIG. 10) and in a deployed configuration (FIG. 11). The airbag 1000 includes an inflator 1002 that is mounted behind a forward portion 1004 of a seat bottom frame 1006 and an airbag cushion 1008 that is distributed around a lower portion of the seat bottom frame 1006 and around the side of the seat bottom frame 1006 that is adjacent the occupant's legs. Cushion 1008 may be attached to seat seat bottom structure by one or more mechanical fasteners 1011. Fasteners 1011 ensure that a portion of the cushion 1008 inflates between the seat bottom frame 1006 and the occupant's lower legs. Fasteners 1011 can be located on the side surface of the seat bottom frame 1006 that is adjacent the lower legs. Alternatively, fastener 1011 can be located on the top surface of the seat bottom frame 1006 with a portion of the cushion 1008 wrapping around the side surface of the seat bottom frame 1006 on the side adjacent the occupant's lower legs and a portion with the attachment over the top surface of the seat bottom frame 1006 (not shown). Positioning the inflator 1002 behind and below the seat bottom frame 1006 may improve the distribution of the inflation energy during an airbag deployment event. For example, during an initial stage of airbag deployment there may be a higher concentration of the inflation energy and positioning the inflator 1002 below and behind the forward portion 1004 places that higher concentration of inflation energy below and behind that forward portion 1004. As the inflation event continues, the inflation energy expands the airbag cushion 1008 and reduces the concentration of energy as the inflation progresses into and expands the airbag 1008. In this manner, the seat bottom front edge airbag 1000 may improve the distribution of inflation energy during an inflation event in a manner where the highest concentration of the inflation energy is under the seat away from the occupant's legs.

Another feature of the seat bottom front edge airbag 1000 is a pivoting reaction surface 1010. The pivoting reaction surface 1010 is pivotally connected to the seat bottom frame 1006 at a pivot 1012. In the stored configuration of FIG. 10, the pivoting reaction surface 1010 is substantially horizontal and may serve as a housing to protect and contain the airbag 1000. During a deployment event, the inflation of the airbag cushion 1008 will cause the pivoting reaction surface 1010 to pivot downwardly. The exemplary embodiment of the pivoting reaction surface 1010 also includes a pivot limiting surface 1014 which limits the rotation of the pivoting reaction surface 1010 about the pivot 1012 during a deployment event. The pivot limiting surface 1014 may contact a rear portion 1016 of the seat bottom frame 1016 which thereby prevents any further rotation of the pivoting reaction surface 1010. In the fully deployed configuration of FIG. 11, the downward position of the pivoting reaction surface 1010 provides a reaction surface 1018 for the airbag cushion 1008 which improves the inflation of the airbag cushion 1008 away from the pivoting reaction surface 1010 and toward the occupant's legs to improve the ability of the airbag cushion 1008 to absorb energy from the occupant's legs.

If the pivoting reaction surface 1010 is not present, the cushion 1008 may extend under the seat as shown with dashed lines 1007 in FIG. 10 and use seat bottom frame 1006 as a reaction surface in a manner similar to that disclosed in co-pending and co-assigned U.S. patent application Ser. No. 15/968,142. In this manner, the cushion 1008, which is attached to the seat frame at the inflator 1002 location can react against the underside of seat bottom frame 1006 where the dashed portion of the cushion 1007 is shown. The cushion pressure and this cushion shape will prevent the cushion 1008 from rotating away from the occupant's legs when the occupant's legs load the cushion 1008.

Cushion 1008 may also have one or more vents 1019 to outside atmosphere, as shown in FIG. 11 to help control energy absorption.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:
1. A vehicle seat comprising:
   a seat bottom having a forward-facing surface relative to the vehicle seat; and
   an airbag mounted to the seat bottom including:
      an inflator mounted to the seat bottom;

an airbag cushion including a portion positioned adjacent to the forward-facing surface of the seat bottom; and a fastener connecting the airbag cushion to the forward-facing surface.

2. The seat of claim 1, wherein the seat bottom partially encompasses the inflator and wherein the seat bottom is configured to allow the airbag cushion to deploy directly downward from the inflator.

3. The seat of claim 1, wherein the seat bottom comprises a seat frame with a forward-facing channel and wherein the inflator is positioned in the forward-facing channel.

4. The seat of claim 1, wherein the airbag cushion is configured to inflate at least partially into a volume in front of the seat bottom in response to activation of the inflator.

5. The vehicle seat of claim 1, wherein the airbag cushion includes a tether attaching a first portion of an inner surface of the airbag cushion to a second portion of the inner surface of the airbag cushion.

6. The vehicle seat of claim 1, wherein the airbag cushion includes a first vent to outside atmosphere.

7. The vehicle seat of claim 6, wherein the airbag cushion further includes a second vent that is aligned to allow gas to pass through the first vent during a first stage of airbag deployment and is configured to misalign to prevent gas from passing through the first vent during a second stage of airbag deployment when the tether has been pulled taught to cause the misalignment of the first vent and the second vent.

8. The vehicle seat of claim 1 wherein the airbag further comprises a reaction surface that moves via forces communicated to it by the cushion during deployment and achieves a resting position where it can support the cushion once the cushion is filled with gas and transmit cushion forces to the seat bottom.

9. The vehicle seat of claim 8, wherein the reaction surface comprises at least two pieces.

10. The vehicle seat of claim 8, wherein the reaction surface is pivotally connected to the seat bottom frame at a pivot that is responsive to an inflation of the airbag cushion to pivot downwardly and rearwardly about the pivot, wherein the reaction surface includes a pivot limiting surface which limits the rotation of the pivoting reaction surface about the pivot.

11. The vehicle seat of claim 1, wherein the inflator is mounted behind a forward portion of a seat bottom frame.

12. The vehicle seat of claim 10, wherein the airbag cushion is distributed around a lower portion and a side portion of the seat bottom frame.

13. A vehicle seat comprising:
a seat bottom having a forward-facing surface relative to the vehicle seat; and
an airbag mounted to the seat bottom including:
an inflator mounted to the seat bottom; and
an airbag cushion including a portion positioned adjacent to the forward-facing surface of the seat bottom, wherein the airbag cushion is configured to react against a portion of the seat bottom away from the inflator and the seat bottom and wherein airbag cushion pressure creates a reaction surface for the airbag cushion that prevents the airbag cushion from rotating rearwardly relative to the vehicle seat.

14. A vehicle seat bottom comprising:
an inflator mounted to the seat bottom; and
an airbag cushion including a portion positioned adjacent to a forward-facing surface of the seat bottom, wherein the seat bottom comprises a seat frame with a forward-facing channel and wherein the inflator is positioned in the forward-facing channel.

15. The vehicle seat bottom of claim 14, wherein the airbag cushion is configured to inflate at least partially into a volume in front of the seat bottom in response to activation of the inflator.

16. The vehicle seat of claim 14, wherein the airbag further comprises a reaction surface that moves via forces communicated to it by the cushion during deployment and achieves a resting position where it can support the cushion once the cushion is filled with gas and transmit cushion forces to the seat bottom.

17. The vehicle seat bottom of claim 14, wherein the inflator is mounted behind a forward portion of a seat bottom frame.

18. The vehicle seat bottom of claim 17, wherein the airbag cushion is distributed around a lower portion and a side portion of the seat bottom frame.

* * * * *